No. 895,756. PATENTED AUG. 11, 1908.
J. A. HICKS.
ANGLE COCK FOR FLUID PRESSURE BRAKE SYSTEMS.
APPLICATION FILED SEPT. 11, 1907.
4 SHEETS—SHEET 3.
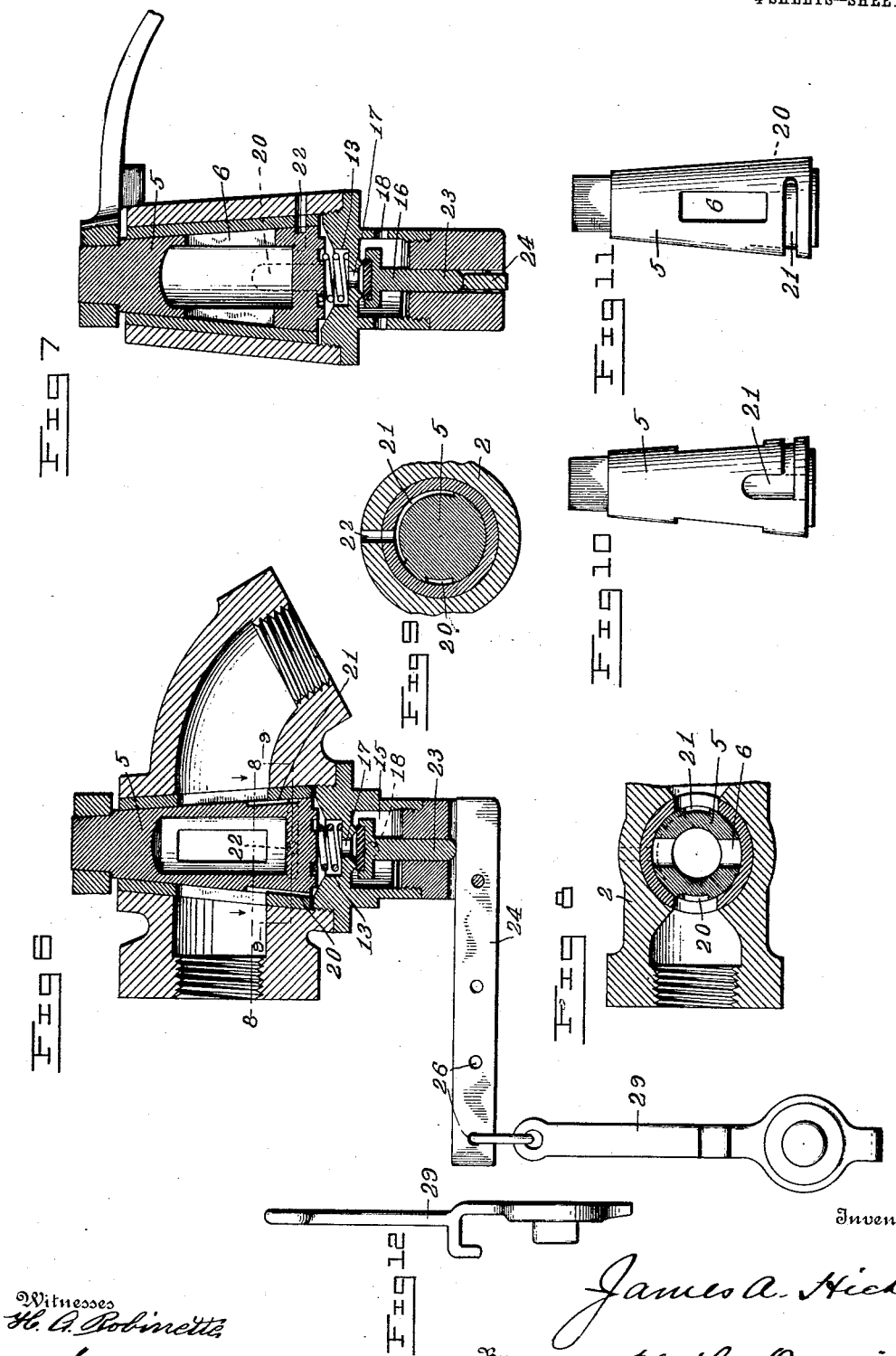

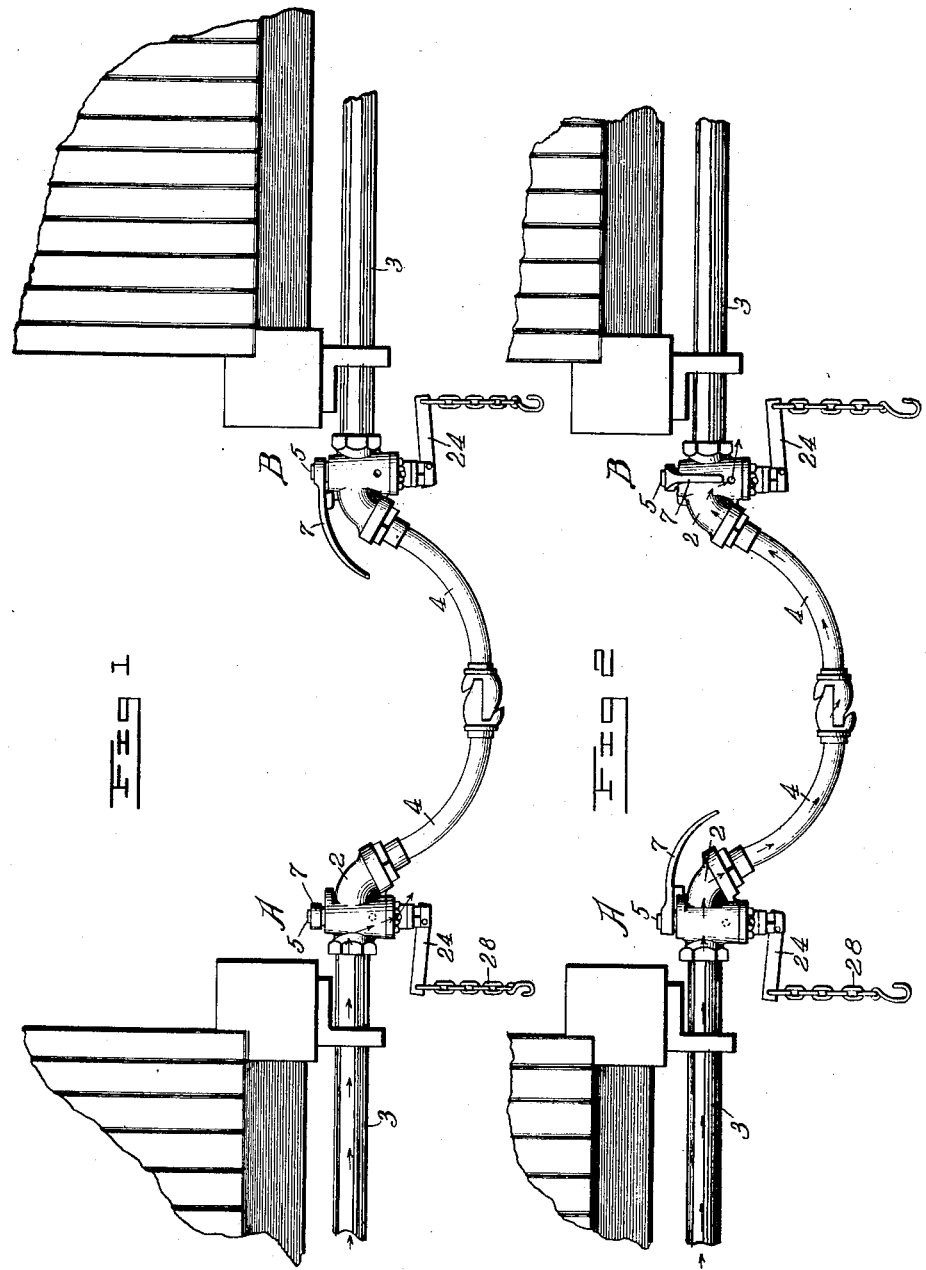

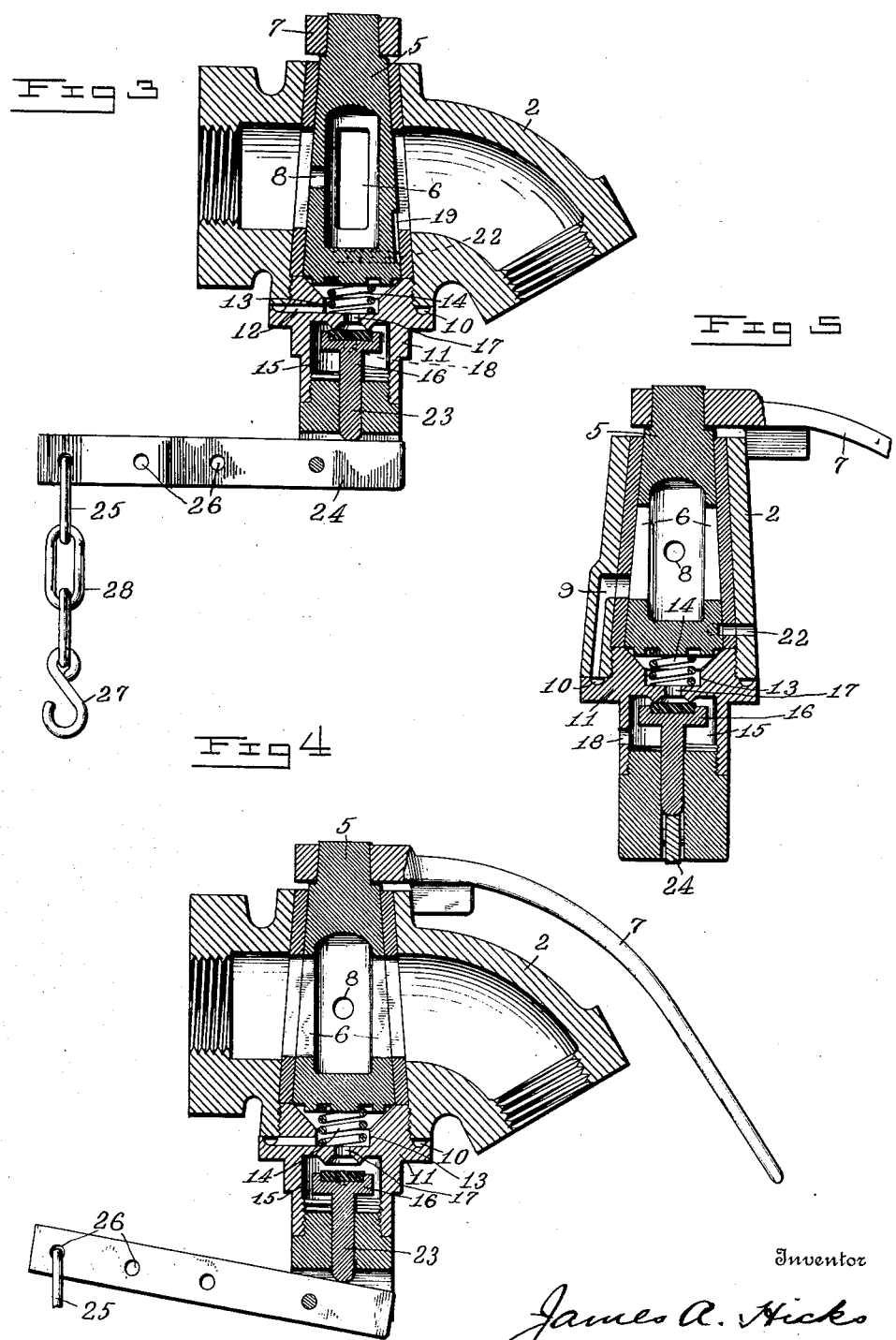

No. 895,756. PATENTED AUG. 11, 1908.
J. A. HICKS.
ANGLE COCK FOR FLUID PRESSURE BRAKE SYSTEMS.
APPLICATION FILED SEPT. 11, 1907.

4 SHEETS—SHEET 4.

Witnesses
H. A. Robinette
A. Cushman

Inventor
James A. Hicks
By N. L. Davis.
Attorney

UNITED STATES PATENT OFFICE.

JAMES A. HICKS, OF ATLANTA, GEORGIA, ASSIGNOR TO HICKS' IMPROVED ENGINE BRAKE COMPANY, OF ATLANTA, GEORGIA, A CORPORATION OF GEORGIA.

ANGLE-COCK FOR FLUID-PRESSURE BRAKE SYSTEMS.

No. 895,756.    Specification of Letters Patent.    Patented Aug. 11, 1908.

Application filed September 11, 1907. Serial No. 392,391.

*To all whom it may concern:*

Be it known that I, JAMES A. HICKS, a citizen of the United States, residing at Atlanta, in the county of Fulton and State of Georgia, have invented certain new and useful Improvements in Angle-Cocks for Fluid-Pressure Brake Systems, of which the following is a specification.

The present invention relates to air-brake equipment for vehicles, and more especially to improved train pipe coupling devices between cars, the improvement having to do particularly with angle cocks and their appurtenances.

Generally stated, the object of the invention is to guard against the danger of a "dry" train section or car at any point in the train, due to failure of the trainmen to properly manipulate the angle cocks in making couplings when cutting in and out cars or sections of the train, or due to accidental or intentional closing of any angle cock at any point; and a further object is to provide means for securing the retention of pressure in the train line if desired, after the hose between cars has been uncoupled.

More specifically the invention contemplates the provision of means, preferably, and in the form herein shown, closely associated with the angle cock, which, first, will set the brakes on the train and prevent their release in event of any one of the angle cocks being closed so as to preclude proper feed-up of the train line and charging of the auxiliaries; and, second, will permit the train line pressure to be held, if this condition is found to be desirable. These conditions are brought about by providing instrumentalities, which, as above stated, are associated with the angle cocks in the illustrated embodiment herein disclosed, which will keep the train line exhausted and the brakes set so long as any angle cock be in closed position and cutting off the feed-up for the train line; such instrumentalities being capable of manipulation to hold the train line or permit it to be fed-up, as the case may be, even after the cock is closed and the exhaust of train line initiated.

Figure 13:
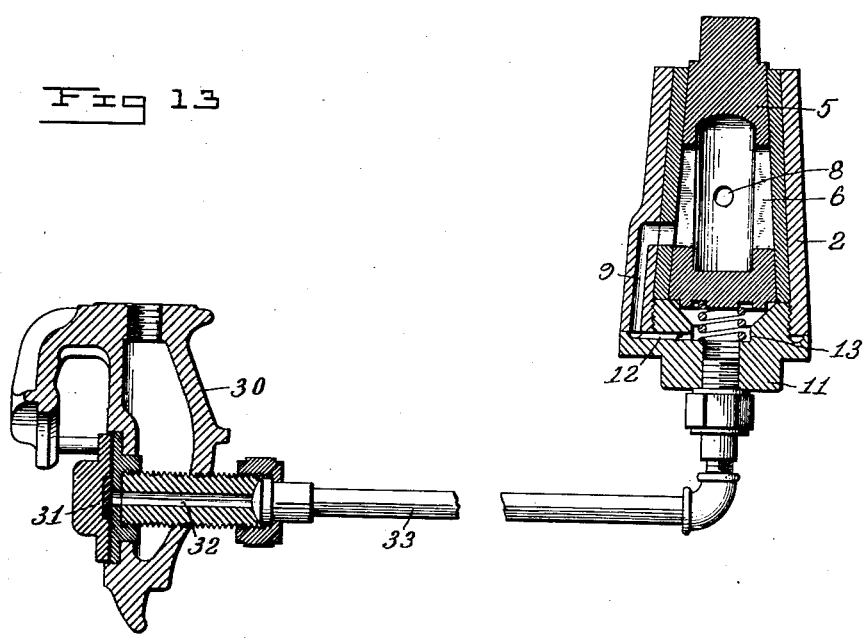
Figure 14:
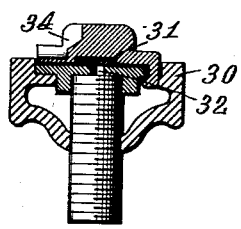
Figure 15:
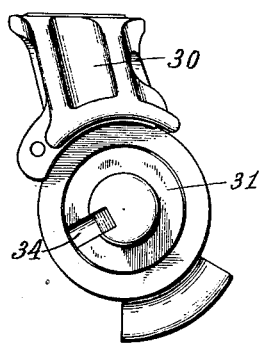
Figure 16:
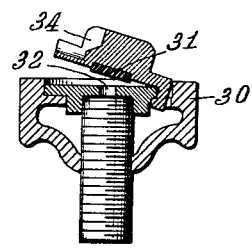

In the drawings herewith, and in which is illustrated one embodiment of my invention, Figure 1 is a general view showing a complete equipment between adjacent cars, showing the action under certain presupposed conditions. Fig. 2 is a similar view showing the action under conditions the reverse of those shown in Fig. 1. Fig. 3 is a sectional view of a closed angle-cock embodying my invention showing the exhaust controlling valve closed. Fig. 4 is a similar view showing the exhaust controlling valve open. Fig. 5 is a sectional view of the angle cock taken at right angles to the plane of section of Fig. 3. Fig. 6 is a sectional view of an angle-cock showing a different but equivalent construction to that shown in Figs. 3, 4, and 5. Fig. 7 is a sectional view of the cock shown in Fig. 6 on a plane at right angles to the plane of Fig. 6. Figs. 8 and 9 are sectional views on lines 8—8, and 9—9, respectively, of Fig. 6, looking in the direction of the arrows. Figs. 10 and 11 are views in side elevation of the main valve or turning-plug of the angle-cock shown in Fig. 6. Fig. 12 is a side view of the "dummy" hang-up device shown in Fig. 6. Figs. 13, 14, 15 and 16 are views of a modified but equivalent form of hose-supporting device.

Referring to the drawings by numerals, (see particularly Figs. 1 to 5, inclusive) like numbers indicating similar or corresponding parts in the several views, 2 designates the angle cock, which may be of the usual or any desired construction, the said angle cock 2 being connected, as is usual, at one end with the train pipe 3 and at the other end with the hose 4. The said cock 2 is provided with the usual valve or turning-plug 5 having the through port 6, and the handle 7 by which it is manipulated, all of which construction is old and well known, and so far as its usual functions of cutting pressure in and out is concerned, the angle cock operates in the usual manner. The turning plug 5 is provided with a port 8, drilled through the wall thereof into the port 6, substantially at right angles thereto, the said port 8 being blanked or closed by the wall of the valve seat when the cock is in open position, but when the cock is closed and the port 6 is blanked the said port 8 is in communication with train line on the train side of the angle cock and a free passage is provided through the port 8 into the port 6. The said port 6, when it is blanked, with the angle cock in closed position, bridges a cavity or groove 9 formed in the wall of the angle cock casing, which cavity 9 leads to a circumferential groove or cavity 10 preferably formed in the nut or head 11 which closes the valve seat at the bottom of the angle cock. From the said groove 10 a passage 12 tapped through the head 11 leads to a cup 13 in the top of the head 11, in which cavity is preferably mounted a spring 14 which holds the valve or plug 5 to its seat. Below said cup is a valve chamber 15 formed in the lower part of the said head 11, in which valve chamber 15 is mounted a valve 16, of any suitable design, controlling a port 17 leading from cup 13 to valve chamber 15, said valve chamber 15, communicating with atmosphere through a port 18 formed in the wall of the head 11. With this construction it is obvious that if the angle cock be in cut-off or closed position, there is a direct communication to atmosphere from the train pipe 3 by way of the port 8, port 6, groove or cavity 9, groove 10, passage 12, valve chamber 13, port 17, and atmospheric port 18. Such an arrangement of exhausts will, of course, bleed the train-line on one side (the train side) of the angle cock 2 so as to break train-line pressure and set the brakes if the angle cock is closed, either through accident or design, and prevent the train pulling away until the fault has been corrected by opening the angle cock to permit proper feed up of the train line, and release of the brakes, all of which will be apparent from an inspection of Fig. 1, in which the angle cock at the point A, which for convenience will be called the forward end of the train is closed, while the angle-cock at the point B, which for convenience will be called the rear end of the train, is open. It is obvious, however, that unless provision be made for bleeding the train-line from both sides (train and hose side) of the angle cock, the system would be ineffective, for the reason that while the angle cock at the point A, Fig. 2, which for convenience will be called the forward end of the train, might be open and in proper condition, if the angle cock at the point B in the equipment, which for convenience will be called the rear end of the train, should be closed, unless provision were made for bleeding the train line through the angle cock B from the hose side, the brakes would not set, the rear portion of the train would be left dry, the engineer would be deprived of the use of all the brakes on this dry section, and he would not be advised of this dangerous condition. To meet this dangerous condition the turning plug or valve 5 is provided at a point substantially opposite the port 8, with a second and independent exhaust, comprising, in the present embodiment, a groove or cavity 19, which, as shown in the present embodiment is L-shaped, the vertical limb of this cavity 19 communicating with the hose side of the angle cock 2 when the cock is in cut-off or closed condition, while the horizontal limb of this L-shaped cavity communicates with an atmospheric port 22 in the wall of the cock casing, so that atmospheric communication will be established through the L-shaped groove or cavity 10, and port 22. With this double provision for bleeding the train line, it is clear that if any angle cock throughout the train be left in cut-off position, the train line will be exhausted and the brakes will be set, and this result will follow regardless of which side of the hose coupling the cut-off angle cock may be, for exhausting of the train line is insured from both sides of any angle cock in the train.

An equivalent, but slightly different construction is shown in Figs. 6 to 11, inclusive, in which instead of leading the exhaust from the train side through the main port in the valve or plug I bring it by means of a groove or cavity 20, formed in the outer wall of the valve 5, directly to the cup 13 in the top of the head 11, and thence by port 17, valve chamber 15, and port 18, to atmosphere, in the manner above described; the cavity 20 being so arranged as to bridge and communicate with the train line passage in the angle-cock when the cock is in cut-out position (see Fig. 6). In this form the exhaust from the hose side of the angle-cock is the same as in the form first described, comprising the L-shaped groove 21 which bridges and communicates with the atmospheric port 22 in the wall of the angle cock casing when the cock is in cut out position (see Figs. 6, 8 and 9).

It is clear that the form just described functions and handles the air in exactly the same manner, under like conditions, as the form described in connection with Figs. 1 to 5, inclusive, and repetition of the operation is deemed unnecessary.

Another feature of my present improvements is the provision of means which will compel the trainmen, in order to preserve the train line intact, to hang up the ends of the hose coupling when they have uncoupled the train line at any point, and this feature I consider of great value, for the reason that it prevents what is not now an uncommon practice, namely, the careless dropping and consequent dragging of the loose hose end and its injury, and also effectually prevents that other harmful practice sometimes indulged in by trainmen of uncoupling the draw-heads or couplers and allowing the hose to be pulled apart as the train separates.

I accomplish the result aimed at, namely, the compulsory hanging up in properly suspended condition of the hose ends, by utilizing the same means above described for exhausting the train line, adding thereto instrumentalities for closing the valve 16, which it will be remembered controls the exhaust from the train-side of the angle-cock. The said valve 16, as shown, is provided with a stem 23 which depends through the nut or head 11, in position to be engaged by the short end of a lever 24, pivotally mounted in the head 11. The said lever 24 has adjustably connected therewith by means of a ring 25 taking into any one of a series of holes 26, a hose support 27 of any desired or convenient form, and in Fig. 3 I have shown a chain 28 provided with a hose supporting hook, while in Fig. 6 a dummy coupling 29 is shown connected to the said lever 24. The said lever 24 is so proportioned that a comparatively small weight, such as would be represented by the weight of a hose coupling, will be sufficient to rock said lever 24 and cause it to lift the valve 16, through the stem 23, and close the exhaust port 17 from the angle cock; but it will be clear that unless the trainman, after uncoupling, shall properly hang up his hose on the lever 24, and seat the valve 14, the train line will be bled, the brakes set, and the train cannot be moved; so that this hanging up of the hose becomes an absolute necessity in the manipulation of the train and the harmful results of letting the hose drag, or pulling the hose apart as the train separates, are effectually guarded against by compelling this hanging-up action on the part of the trainmen. The advantage of this feature of my improvement in connection with the live section of the train, or that coupled to the engine is apparent, but it is also of value in connection with the dead or uncoupled section of the train, for the hanging-up operation will result in retaining some train-line pressure in the dead section, so that the train-line will not be absolutely exhausted, and the labor of recharging imposed on the pump will be materially lessened, yet at the same time when the hose is uncoupled and before the trainman can hang up his hose there will be a sufficient reduction in the train-line of the dead section to set the brakes and hold the train under ordinary conditions and on usual grades.

Instead of the construction shown in Figs. 3, 4, and 6, and just described, I may provide (see Figs. 13, 14, 15 and 16) at a convenient point on the car a hang-up head 30 for the hose, which is substantially the ordinary "dummy" coupling, but which has a coupling seat provided with a valve 31, closing a port 32, communicating by means of pipe 33 with the lower part of the head 11 of the angle cock, the said valve 31, when the hose coupling is engaged with the head 30 and hung up, being closed, so as to cut off exhaust from the angle cock through the connection 33, and I preferably score or groove the valve 31 on its outer face at 34 to permit the air to escape from the hose. In other words the construction of hang-up device just described is the equivalent of the lever hang-up device shown in the other views and hereinbefore described, except that in the construction just set forth I place the exhaust-controlling valve on the hang-up device instead of in the angle cock itself, the operation being the same when the hose is put in place.

The embodiment of my invention herein set forth is the best now known to me, but since changes involving merely the skill of the mechanician and the adoption of equivalent elements may obviously be made, I do not limit myself to the illustrated embodiment, except in so far as I am limited by the prior art to which the invention belongs.

Having fully disclosed my invention, I claim:

1. An angle-cock provided with means for exhausting train line when the cock is closed, a normally open valve to control said exhaust, and manually operable means for closing said valve.

2. An angle-cock provided with means for exhausting train line when the cock is closed, a normally open valve to control said exhaust, and a hose-support which effects closure of said valve when the hose is hung up.

3. An angle-cock provided with means for exhausting train line from both sides when the cock is closed, and a valve controlling the exhaust from one side of said cock.

4. An angle-cock provided with means for exhausting train line from both sides when the cock is closed, and a normally open valve controlling the exhaust on one side of said cock.

5. An angle-cock provided with means for exhausting train line from both sides when the cock is closed, and a normally open valve controlling the exhaust on the train side of said cock.

6. An angle-cock provided with means for exhausting train-line from both sides when the cock is closed, a normally open valve controlling the exhaust on the train side of said cock, and means for closing said valve.

7. An angle cock having means for exhausting train line on both sides when the cock is closed, a normally open port for the exhaust on the train side of the cock, and means operable upon hanging up of the hose for closing said port.

8. An angle cock provided with means for exhausting train-line from both sides when the cock is closed, a normally open valve controlling the exhaust on the train side of said cock, and a hose-support which effects closure of said valve when the hose is hung up.

9. An angle-cock provided with means for exhausting train line when the cock is closed, a normally open port for said exhaust, a valve for said port, and a movable hose-support to engage and seat said valve when the hose is hung up.

10. An angle cock provided with means for exhausting train line on both sides when the cock is closed, a normally open port for the exhaust on the train side of the cock, a valve for said port, and a movable hose-support to engage and seat said valve when the hose is hung up.

11. An angle cock provided with an exhaust passage which is always open to atmosphere to bleed train line on one side of the angle cock when the cock is closed, a second exhaust passage to bleed train line on the other side and a valve controlling said second passage.

12. An angle cock provided with an exhaust passage which is always open to atmosphere to bleed train line on one side of the angle cock when the cock is closed, a second exhaust passage normally open when the cock is closed to bleed train line on the other side, and a valve operable to close said second passage.

13. An angle cock provided with an exhaust passage on the hose side which is always open to atmosphere to bleed train line when the cock is closed, a second exhaust passage on the train side normally open when the cock is closed, and a manually operable valve to close said second passage.

14. An angle cock provided with an exhaust passage on the hose side which is always open to atmosphere to bleed train line when the cock is closed, a second exhaust passage on the train side normally open when the cock is closed, a valve to close said second passage, and a hose hang-up device operable to close said valve.

15. An angle cock having a turning plug recessed on opposite sides with exhaust grooves which bridge train line on both sides when the cock is closed, an exhaust port for each of said grooves, and a valve controlling one of said ports.

16. An angle cock having a turning plug recessed on opposite sides with exhaust grooves which bridge train line on both sides when the cock is closed, an exhaust port for each of said grooves, a normally open valve controlling one of said ports, and manually operable means for closing one of said ports.

17. An angle cock having a turning plug provided on opposite sides with independent exhaust passages which bridge train line on both sides when the cock is closed, an exhaust cavity in the casing with which one of said passages communicates, an exhaust port in the casing head to receive the exhaust from said cavity, a valve controlling said port, and an open atmospheric port to which the other plug passage delivers.

18. An angle cock having a turning plug provided on opposite sides with independent exhaust passages which bridge train line on both sides when the cock is closed, an exhaust cavity in the casing with which one of said passages communicates, a bottom casing nut having a circumferential groove to which said cavity delivers, a passage leading from said groove to a chamber beneath said plug, a normally open atmospheric port for said chamber, a valve controlling said port, and an open atmospheric port for the second plug passage.

In testimony whereof I affix my signature in presence of two witnesses.

JAMES A. HICKS.

Witnesses:
 A. V. CUSHMAN,
 G. M. STUCKER.